Patented May 25, 1926.

1,586,087

UNITED STATES PATENT OFFICE.

CHARLES C. HOWE, OF WYOMING, RHODE ISLAND, AND STEPHEN W. LIBBY, OF WATERTOWN, MASSACHUSETTS, ASSIGNORS TO WARREN SOAP MANUFACTURING COMPANY, OF BOSTON, MASSACHUSETTS, A CORPORATION OF MASSACHUSETTS.

COOLING COMPOUND FOR AXLES.

No Drawing.   Application filed February 2, 1922.   Serial No. 533,648.

The main purpose of our invention is to produce a material which may be used to treat hot boxes on railroad cars, and may be used in other places where temporary cooling and lubrication are necessary in order that the car or other device may be kept in operation until the bearings become cool.

By the use of this compound cars with hot boxes can be taken to terminals (unless there is some mechanical defect) without expensive train delays, disorganized schedules and loss of tonnage caused by cut-outs as well as saving of the expense in sending inspectors and mechanics to isolated points.

Where the compound is used when bearings show signs of becoming hot, many hot boxes may be prevented, and boxes that do run hot can be taken through to destination without cutting out the car.

It is well known that hot boxes are often the result of some imperfection in the bearings which cannot be overcome by mere lubrication. The only satisfactory treatment heretofore known has been the obliteration in some way of the imperfection, and this must usually be done in the repair shop or yard where the necessary tools and mechanics are available.

It is well known that finely ground mica is a good lubricant when combined with oil, but the tendency of mica in such a mixture (if the same is a liquid mass) is to settle to the bottom of the container and in the case of a journal box to settle to the bottom of the box so that it accomplishes only a comparatively small proportion of its intended work.

By our invention we provide a paste like or substantially solid homogeneous mass in which the mica or other like material is held in suspension so that it is all through the lubricant which carries it and hence whenever the lubricant comes in contact with the axle it carries with it a greater or less amount of the mica which attaches itself to the axle or bearings, filling in the inequalities of the surface, and so decreases the irregularities by which the friction is caused.

Railroad journal bearings carry a very heavy load and are subject to a mashing pressure which is apt to destroy the lubricating film between the bearing surfaces that is necessary and must be maintained to prevent heat and friction and insure lubrication. This is prevented by the fine flakes of mica fed onto the journal by the compound, as the mica cannot be broken down or disintegrated by any weight or mashing pressure, but forms a permanent lubricating film between the bearing surfaces, obviating all friction and heat therefrom.

The soluble soap while acting as a binder to hold the fine flakes of mica in suspension has peculiar cooling qualities which aid greatly in cooling the heated bearings as well as in maintaining the oil below vaporizing or igniting temperatures while the oil in the compound furnishes additional lubrication.

Our invention therefore consists in a compound containing a solid lubricant such as mica held in suspension in a liquid lubricant such as oil, by means of a binder.

In carrying out our invention we have secured the best results by mixing with say 44 parts of lubricating oil 26 parts of ground mica and 14 parts of water soluble soap with 12 parts of water. To this may be added 3 parts of caustic soda lye and, if desired, 1 part of graphite which like mica is a lubricant. The soda lye can sometimes be omitted.

The oil above referred to may be mineral oil, but we prefer that of the oil, 15 per cent be a saponifiable animal or vegetable oil, in which case the use of the lye and water causes further saponification. The said 44 parts of lubricating oil will accordingly be seen to consist (initially) of 6.6 parts of fatty oil (saponifiable animal or vegetable oil) in admixture with 37.4 parts of mineral oil.

In practice the soap is warmed into fluid condition and into it are stirred the oils; then the lye and water are added and thoroughly mixed therewith and into the mixture the mica and graphite (if the latter is used) are stirred, the whole forming a paste. If the material is desired in cake form the amount of soap in the above formula can be increased to about 25 parts.

The above proportions are suggestive merely and indicate the amounts used to produce a product which has been found very useful.

It may be applied by a trowel or any suitable implement to the axle box without removing the waste or packing and as it permeates or is absorbed by the waste no residue is left in the box. Furthermore it will be found that the compound does not in any way injure the waste or packing which is suitable for further use.

While we have described our compound as useful for treating hot boxes, it may be used for many other like purposes and in many other places where friction may develop.

While we have referred to mica in description and our claims, we do not mean to limit ourselves to that substance, but to include as the equivalent thereof any other chemically inert substance or substances of similar nature or having similar characteristics.

What we claim as our invention is:—

1. A compound for cooling and lubricating metallic surfaces comprising mineral oil, saponifiable fatty oil, water-soluble soap and mica in such proportions as to form a cake of material which is solid at atmospheric temperature, and which material is free from solids harder than mica.

2. A compound for cooling and lubricating hot bearings consisting essentially of the reaction products of about 26 parts of mica, about 6.6 parts of fatty oil, about 37.4 parts of mineral lubricating oil, about 14 parts of water-soluble soap, about 12 parts of water and about 3 parts of soda lye, whereby said compound will absorb heat from the bearings and will spread over and fill in any irregularities in the bearings.

3. A compound for cooling and lubricating hot bearings of railway rolling stock comprising lubricating mineral oil containing saponifiable fatty oil, water-soluble soap, and water in such proportions as to form a stable composition of a paste-like to substantially solid consistency, whereby the soap and water in said compound will absorb heat from the bearings and maintain the oil at a temperature insufficient to vaporize the oil; such mixture also containing incorporated throughout its body, a solid lubricant which is a flake-like soft silicate mineral not substantially harder than mica, and having lubricating properties, the amount of such solid lubricant being substantially over one half of the amount of said lubricating mineral oil and the amount of soap being substantially over one third the amount of said mineral oil.

CHARLES C. HOWE.
STEPHEN W. LIBBY.